US008213931B2

(12) United States Patent
George et al.

(10) Patent No.: US 8,213,931 B2
(45) Date of Patent: Jul. 3, 2012

(54) OFF PRL WIRELESS ACQUISITION SYSTEM

(75) Inventors: David George, Sterling Heights, MI (US); William E. Mazzara, Jr., Drayton Plains, MI (US)

(73) Assignee: General Motors LLC, Detroit, MI (US)

( * ) Notice: Subject to any disclaimer, the term of this patent is extended or adjusted under 35 U.S.C. 154(b) by 1291 days.

(21) Appl. No.: 11/759,577

(22) Filed: Jun. 7, 2007

(65) Prior Publication Data
US 2008/0305789 A1    Dec. 11, 2008

(51) Int. Cl.
*H04W 4/00*    (2009.01)
(52) U.S. Cl. .................. 455/432.1; 455/423; 455/435.2; 455/552.1
(58) Field of Classification Search .... 455/432.1–435.3, 455/423, 552.1
See application file for complete search history.

(56) References Cited

U.S. PATENT DOCUMENTS

| | | | |
|---|---|---|---|
| 6,625,451 B1 * | 9/2003 | La Medica et al. | 455/434 |
| 7,031,717 B2 * | 4/2006 | Mazzara | 455/450 |
| 7,047,008 B2 * | 5/2006 | Martlew | 455/435.2 |
| 7,123,907 B2 * | 10/2006 | Sumcad et al. | 455/423 |
| 7,123,912 B2 * | 10/2006 | Kim et al. | 455/435.3 |
| 7,139,587 B2 * | 11/2006 | Ishii | 455/552.1 |
| 7,194,264 B2 * | 3/2007 | Li et al. | 455/432.1 |
| 7,260,087 B2 * | 8/2007 | Bao et al. | 370/352 |
| 7,260,394 B2 * | 8/2007 | Welnick et al. | 455/432.1 |
| 7,274,933 B2 * | 9/2007 | Zinn et al. | 455/435.2 |
| 7,305,236 B2 * | 12/2007 | Schwinke et al. | 455/425 |
| 7,349,695 B2 * | 3/2008 | Oommen et al. | 455/435.2 |
| 7,471,659 B2 * | 12/2008 | Huang et al. | 370/335 |
| 7,542,451 B2 * | 6/2009 | Cooper et al. | 370/335 |
| 7,734,291 B2 * | 6/2010 | Mazzara, Jr. | 455/436 |
| 7,835,741 B2 * | 11/2010 | Lee et al. | 455/435.2 |
| 7,904,060 B2 * | 3/2011 | Krause | 455/414.1 |
| 8,050,673 B2 * | 11/2011 | Madhavan et al. | 455/426.2 |
| 8,068,808 B2 * | 11/2011 | Smith | 455/404.2 |
| 2005/0037755 A1 * | 2/2005 | Hind et al. | 455/435.3 |
| 2006/0234705 A1 * | 10/2006 | Oommen | 455/435.3 |
| 2007/0275719 A1 * | 11/2007 | Lee et al. | 455/435.2 |
| 2007/0281684 A1 * | 12/2007 | Parmar et al. | 455/432.1 |
| 2008/0146202 A1 * | 6/2008 | Krause | 455/414.1 |
| 2011/0189991 A1 * | 8/2011 | Krause et al. | 455/432.1 |

* cited by examiner

*Primary Examiner* — Lester Kincaid
*Assistant Examiner* — Steven Kelley
(74) *Attorney, Agent, or Firm* — Leydig, Voit & Mayer, Ltd.

(57) ABSTRACT

The invention relates generally to a system for providing an roaming carrier list to a remote wireless device such as a vehicle communications package (VCP), while largely overcoming several shortcomings of prior techniques. A more intelligent Off PRL Wireless System is proposed that will scan all wireless bands including opposite cellular bands and PCS. The VCP will place test calls to the wireless carrier found during the scan. All wireless carriers found during the scan will be used to populate the Off-PRL System Availability Table (the OPA Table) including those the VCP was detected as "Unavailable". Each carrier in the OPA Table will be denoted as Available and Unavailable depending on whether the VCP was able to access the carrier. Once the fall scan is completed, the VCP will connect the carrier listed first as available in the OPA Table.

15 Claims, 6 Drawing Sheets

OFF PRL WIRELESS ACQUISITION SYSTEM

OFF PRL WIRELESS ACQUISITION SYSTEM

BACKGROUND OF THE INVENTION

Mobile wireless communications devices are by definition transportable, and because of this it is sometimes complicated to ensure continued connectivity to such devices. For example, many carriers and providers exist, and a user may venture into areas where their chosen provider does not have equipment available to provide the desired service. In these instances, the user is said to be "roaming." Roaming entails the use of a network other than the user's assigned or chosen primary carrier and network.

When a device is in a roaming condition, the user will be charged by the operator of the new network, and may be charged a different, and potentially much larger, fee than they typically pay to their primary network. In addition, since they generally are still required to pay their primary network, this situation can result in the incurrence of exorbitant fees in a short amount of time. To ameliorate this situation, network providers typically have certain partners that they prefer to use for roaming services. The use of the partner facilities enable the mobile user to incur lower charges, and in some cases receive better service, than they otherwise would have.

With respect to CDMA, PCS and other services for example, the selected partner networks are typically listed in what has come to be known as a Preferred Roaming List (PRL). The PRL is a data file that lists alternative networks for use when a primary wireless network is not reachable. The PRL typically lists bands, sub bands and service provider identifiers that a device should accept. A mobile wireless, e.g., cellular, device may or may not be able to obtain service outside of a home area without the PRL, and in addition, if the device is able to roam, the incurred fees may be significant without a PRL. Fundamentally, the PRL typically allows the mobile device to select a best carrier when roaming. For example, roaming partners may provide discounted roaming rate agreements, so it is desirable to use such carriers when possible, while avoiding carriers that may not be affiliated with the primary network and which may therefore charge a premium roaming fee to users.

Thus, it is generally advisable for the PRL for a mobile device be maintained in a reasonably up-to-date state. This is especially important for users that travel and use their device outside of their home area frequently. Not only are such mobile users more likely to use other networks, but they are more likely to make substantial use of such carriers and thus to incur significant overcharges if lack of an appropriate PRL prevents them from using preferred roaming partners.

However, attempting to access a carrier listed on the PRL may be inefficient for several reasons. For example, a carrier may not be available on the same side of the wireless band as the home side. Even if a carrier is available on the same side as the home side, the carrier may be of a technology that is not compatible with the mobile device. Another reason for inefficiency is that the accessible carrier may not have a roaming agreement with the mobile device's home carrier. Further, it is sometimes the case that the only accessible carrier may be on the opposite side of the cellular band or in the PCS band. A better system is needed for selecting appropriate networks and carriers when a device is outside of its home area.

BRIEF SUMMARY OF THE INVENTION

While aspects of the invention will be discussed in detail below, this brief summary of the disclosure provides an overview of certain elements.

The invention relates generally to a system for providing a roaming carrier list to a remote wireless device such as a vehicle communications package (VCP), while largely overcoming several shortcomings of prior techniques. In particular, a new Off PRL Wireless Acquisition System scans all wireless bands including opposite cellular bands and PCS. The VCP places test calls to the wireless carrier found during the scan. All wireless carriers found during the scan are placed into the Off-PRL System Availability Table (the OPA Table) including those that the VCP detected as "Unavailable." Each carrier in the OPA Table is denoted as Available and Unavailable depending on whether the VCP was able to access the carrier. Once the full scan is completed, the VCP connects to the carrier listed first as available in the OPA Table.

Additional and alternative aspects of the invention will become apparent from the following description taken in conjunction with the attached figures, of which:

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
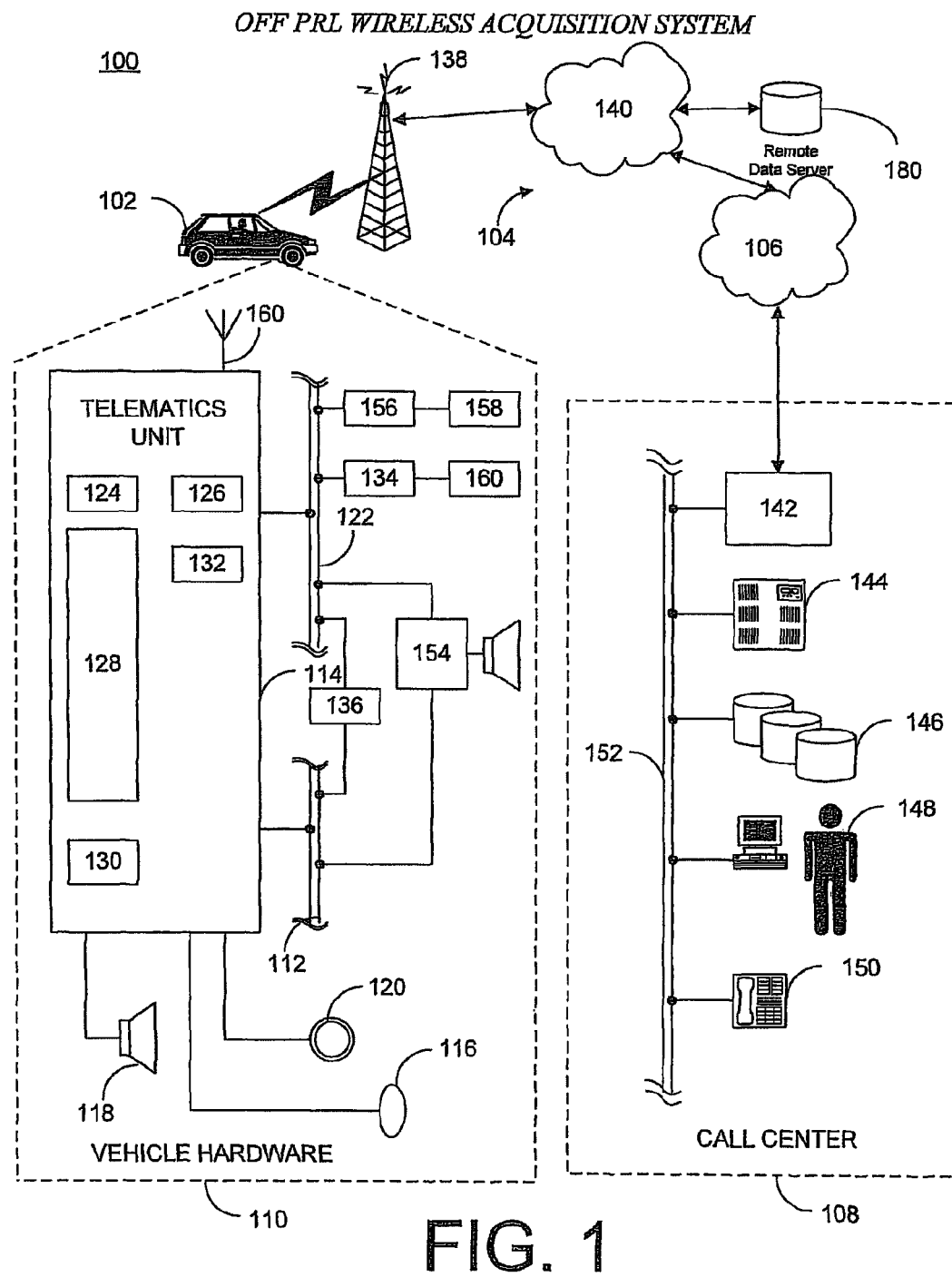
FIG. 1 is a schematic view of an example communication system within which examples of the present invention may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware (also called the VCP) 10 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122.

Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, videogames and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic pushbutton used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 160, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Wireless carrier systems, such as the one pictured in FIG. 1, use different frequencies to route their wireless communications. For example, the 800 MHz Cellular band refers to the specific frequency ranges of 824.01-848.97 MHz and 869.01-893.97 MHz. In every geographical region of the United States, there can be up to two carriers operating in the 800 MHz cellular band. These are referred to as the "A" and "B" carriers in an area. The "A Side" carrier can use one half of the frequencies in the cellular band while the "B Side" carrier uses the other half. Carriers A and B are each assigned 832 frequencies: 790 for voice and 42 for data. A pair of frequencies (one for transmit and one for receive) are used to create one channel. The frequencies using analog voice channels are typically 30 kHz wide. The transmit and receive frequencies of each voice channel are separated by 45 MHz to keep them from interfering with each other.

Carriers implement different wireless technologies to facilitate communications. These technologies include Global System for Mobile Communication (GSM) and Code Division Multiple Access (CDMA). Every carrier that operates in the A or B cellular band is required to run the older, analog Advanced Mobile Phone System (AMPS) protocol on at least a small number of their frequency channels in order to maintain backwards compatibility with older AMPS phones, and to facilitate roaming.

CDMA gives a unique code to each call and spreads it over the available frequencies. CDMA is significantly different technology as compared to GSM. After digitizing data, CDMA "spreads" the data over the entire available bandwidth of the frequency range. Multiple calls are overlaid on the channel, with each assigned a unique sequence code. CDMA is a form of spread spectrum technology, meaning that data is sent in small pieces over a number of the discrete frequencies available for use at any time in the specified range. Thus, if a carrier uses the 824.01-848.97 MHz frequency range, then by using CDMA technology and spread spectrum techniques, it modulates the wireless communication with a unique sequence code, spreading it across the whole frequency range, not only on a narrow 30 kHz channel as in other cellular technologies.

PCS is allocated 140 MHz of space between 1850 MHz and 1990 MHz for broadband PCS and 3 MHz in the 900 MHz range for narrowband PCS. Carriers implement CDMA and GSM wireless technologies in the PCS band.

Figure 2:
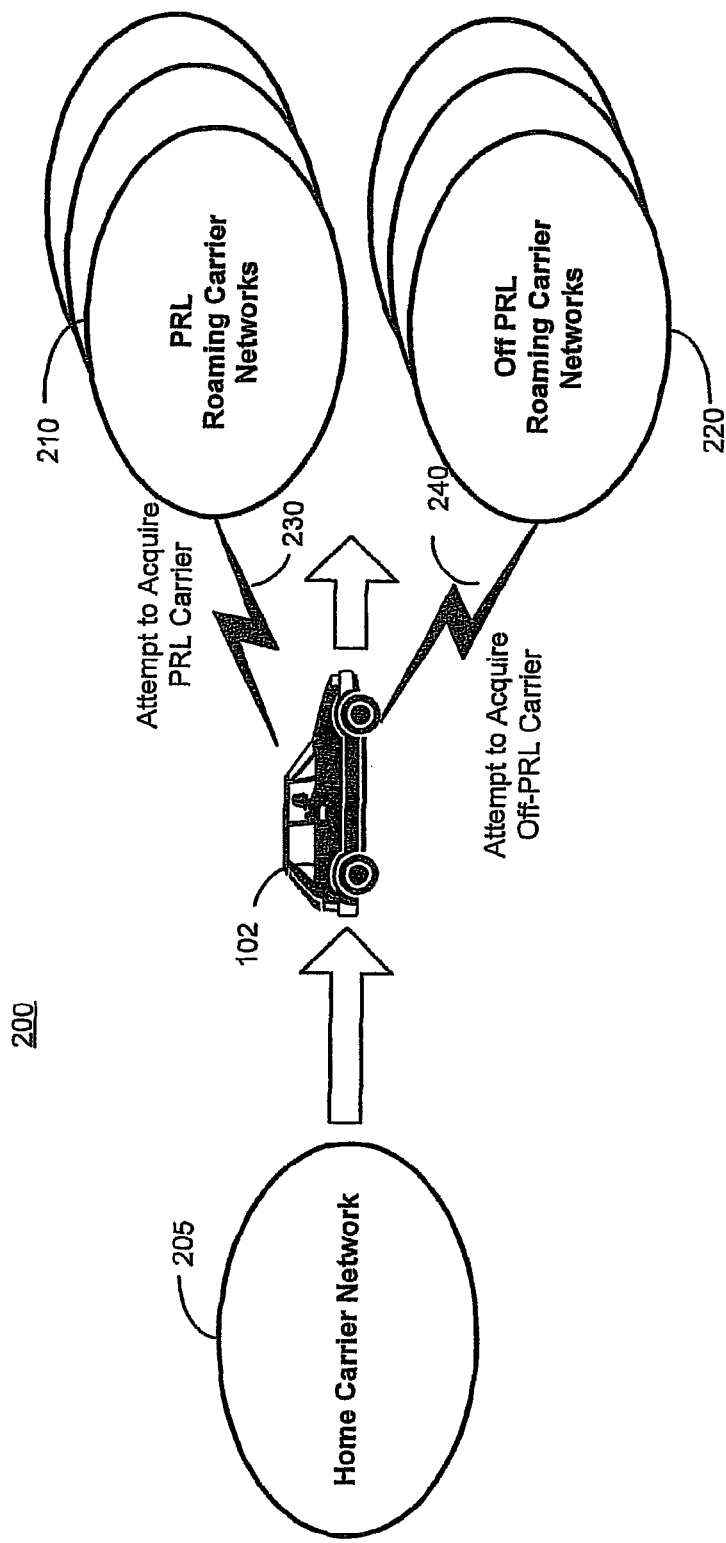
FIG. 2 illustrates a general architectural overview of a system contemplated by an exemplary implementation.

FIG. 2 illustrates a general architectural overview of a system contemplated by an example. An illustrative example of the present invention relates generally to a system for providing an updated roaming carrier acquisition list to a remote wireless device such as a vehicle communications package (VCP 110), while largely overcoming several shortcomings of prior techniques. When a vehicle 102 with a VCP 110 leaves its home carrier network 205 and enters a roaming network, the acquisition wireless system will first attempt to access a wireless carrier 230 on its Preferred Roaming List (PRL) 210. However, if no accessible carrier is found from the PRL, the VCP 110 will implement an Off PRL Wireless Acquisition System (OPA). In general, the VCP will attempt to acquire a wireless carrier system 220 from the PRL via communication 240.

Figure 3:
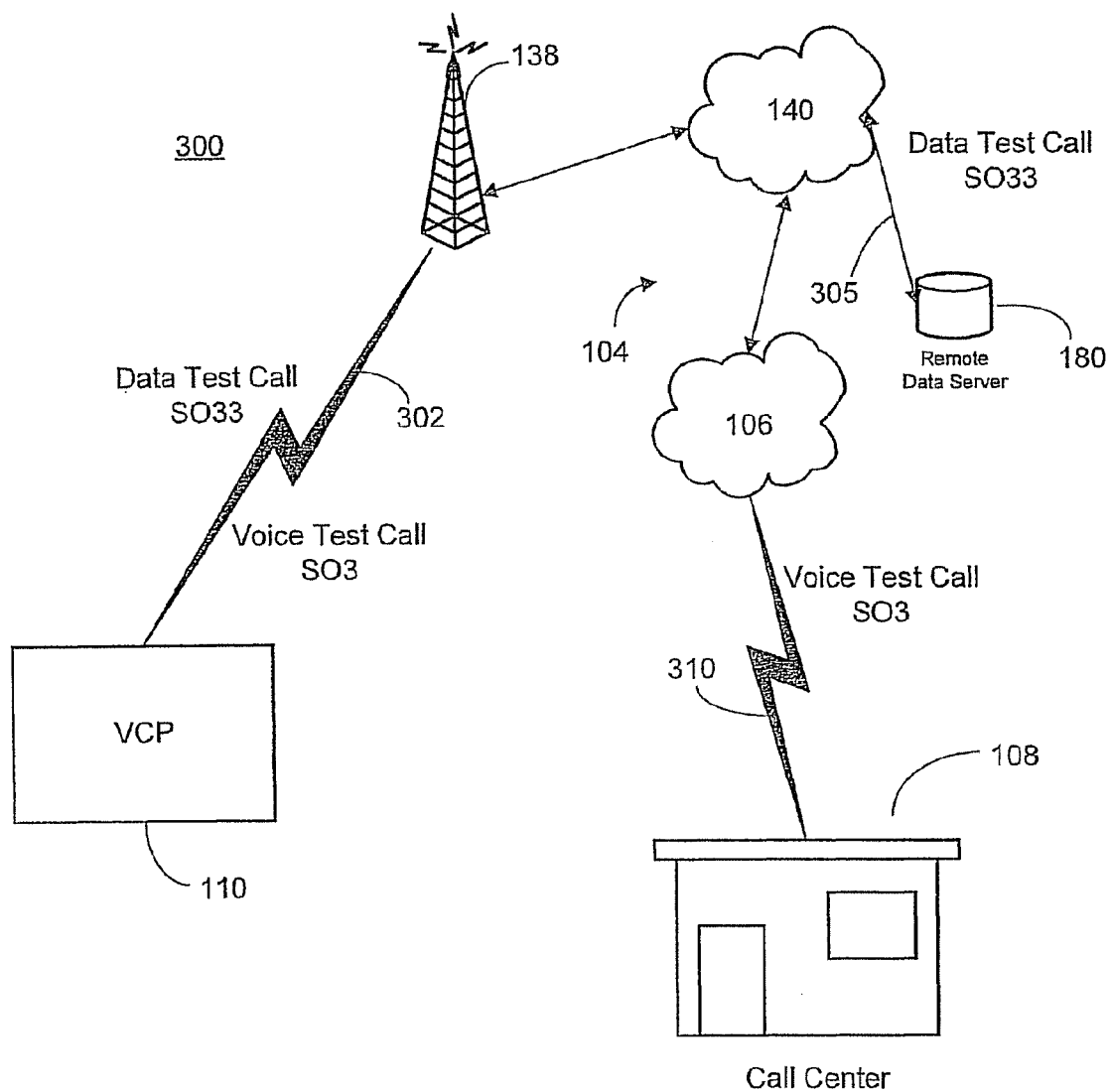
FIG. 3 illustrates a general architectural overview of a system contemplated by an exemplary implementation.

FIG. 3 illustrates a general architectural overview of a system contemplated by an example. The VCP 110 scans all wireless bands including both A and B side cellular bands and the PCS band. The VCP 110 places test calls to the wireless carrier found during the scan. All wireless carriers found during the scan are used to populate the Off-PRL Availability Table (the OPA Table) including those the VCP was unable to access. Each carrier in the OPA Table is denoted as "Available" or "Unavailable," depending on whether the VCP 110 was able to access the carrier. Once the full scan is completed, the VCP 110 acquires the first available carrier listed in the OPA Table.

Service Option 33 (SO33) test calls detect off PRL carriers. The packet data services in wireless networks primarily identified with SO33 allow data exchange between wireless devices and a remote server over wireless data network. Thus, in FIG. 2, a VCP 110 places a Data Test Call SO33 over communication link 302 to a cell tower 138. Once a SO33 test call is placed, the VCP 110 attempts to verify that the wireless carrier network is accessible by using the PPP authentication protocol between itself and a remote data server on the wireless data network. Thus, the data test call SO33 is routed from the cell tower 130 through a wireless network 140 to a remote data server 180. If PPP authentication between the VCP 110 and remote data server is successful, then the VCP 110 determines that it can access the local wireless carrier, populates the OPA Table with the local carrier name, and designates it as available.

However, because roaming agreements between some wireless carriers only cover voice calls, a voice test call, or Service Option 3 (SO3) test call is placed to the Call Center (OCC) 108, if the PPP authentication fails. Thus, a Voice Test Call SO3 is placed by the VCP 110 to the OCC 108 over communication link 302 to the cell tower. The voice test call SO3 is then routed through the wireless carrier network 140 and the land network 106 to the OCC 108 over communication link 310. If during the voice test call a 2225 Hz carrier tone is detected, then the local wireless carrier is considered accessible and the carrier identity information is populated in the OPA Table. Alternatively, if neither a data nor voice test call is successful within thirty seconds of being placed, the OPA Table is populated with the name of the wireless carrier and designated as "Unavailable" in the OPA Table.

Figure 4:
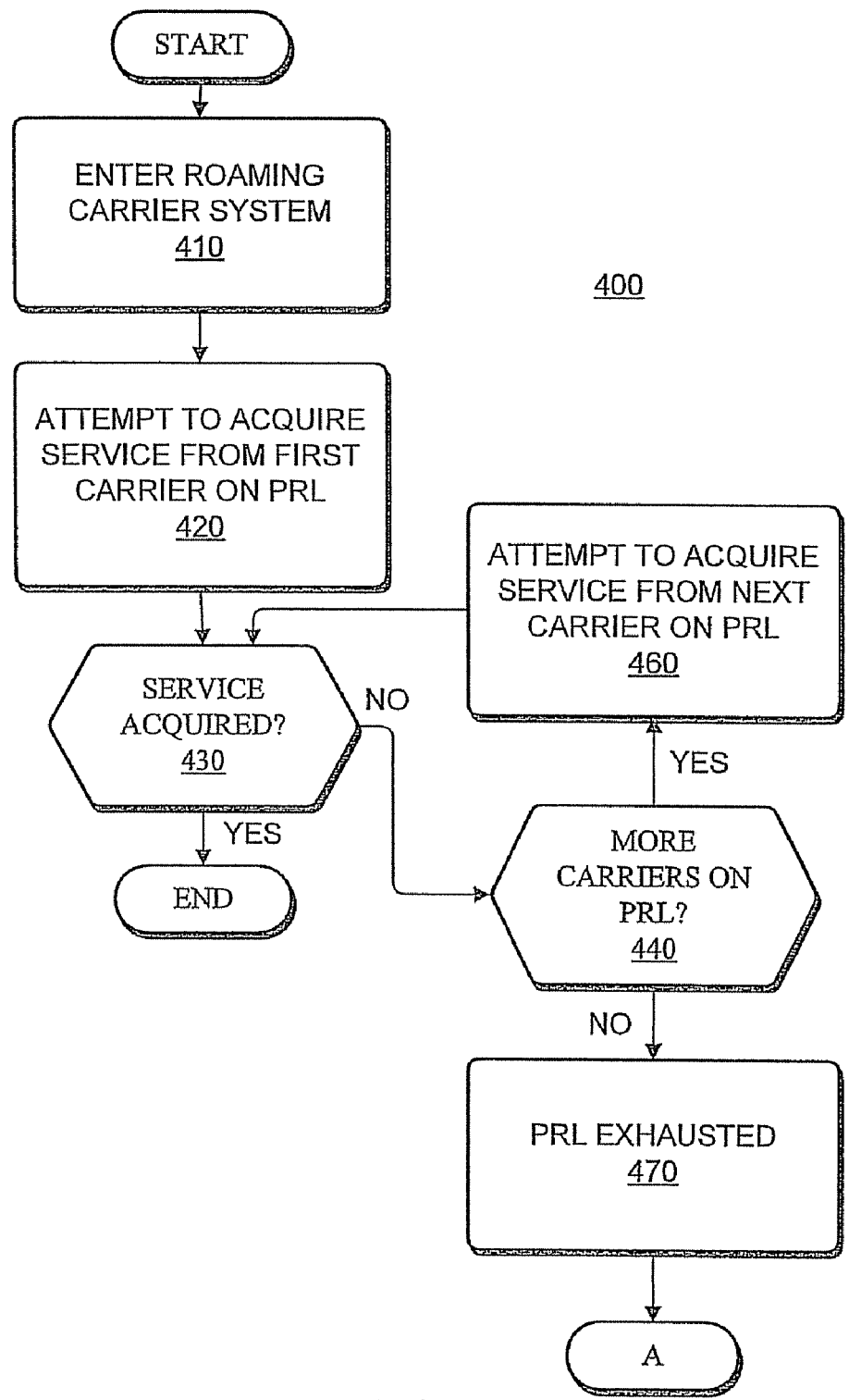
FIG. 4 is a flow diagram illustrating a method of acquiring an Off PRL carrier system, in accordance with an exemplary implementation.
Figure 5:
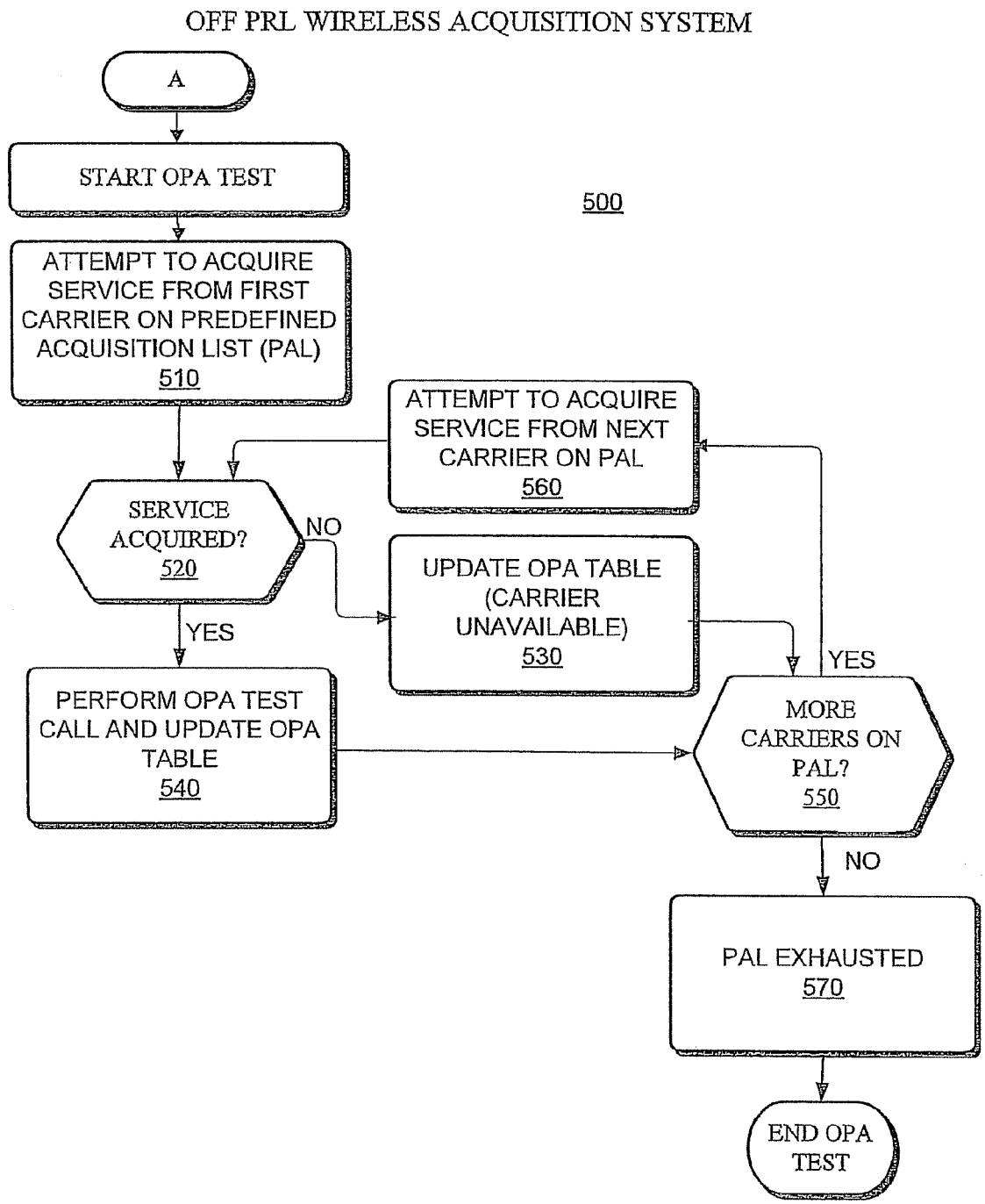
FIG. 5 is a flow diagram illustrating a method in acquiring an Off PRL carrier system, in accordance with an exemplary implementation.

FIGS. 4-5 are a flow diagram illustrating a method of acquiring an Off PRL carrier system, in accordance with an example. FIG. 4 illustrates a process 400 of acquiring a wireless carrier when first entering a roaming carrier system. The VCP enters the roaming carrier system at stage 410. At stage 420, the VCP 110 attempts to acquire service from the first carrier listed in the PRL. Subsequently, the VCP 110 determines whether service is acquired at stage 430. If service is detected, the Off PRL acquisition ends. However, if the VCP 110 does not detect service, at stage 440, it determines whether there are any more carriers listed in the PRL. If so, at stage 460, the VCP 110 attempts to acquire service from the next carrier listed on the PRL. The VCP then determines again if service is acquired to this next carrier listed in the PRL at stage 430. Alternatively, if the VCP has exhausted the list of PRL carriers 470 by attempting to acquire service from every carrier listed on the PRL, then the Off PRL Wireless Acquisition (OPA) process 400 proceeds to stage A.

FIG. 5 is a flow diagram illustrating further steps in a process 500 for acquiring an Off PRL carrier system in accordance with an example. At stage 510, the VCP implementing the OPA process attempts to acquire service from the first carrier on the Predefined Acquisition List (PAL). The PAL is a list of known Off PRL wireless carriers provided to the VCP to implement the OPA process and populate the OPA Table. After attempting to acquire service, the VCP 110 detects at stage 520 whether service was actually acquired. If no service is detected, the OPA System updates the OPA Table and designates the carrier as "Unavailable" at stage 530. Conversely, if at stage 520, the VCP 110 detects that service is actually acquired, then at stage 540 it performs an OPA test call (either a SO33 Data Test Call or a SO3 Voice Test Call SO3) and updates the OPA table, designating the carrier as "Available." After updating the table, the VCP determines whether there are any more carriers listed on the PAL at stage 550. If so, then the VCP 110 attempts to acquire service from the next carrier listed in the PAL at stage 560. Alternatively, if the VCP has exhausted the list of carriers in the PAL then the OPA System ends at stage 570.

Figure 6:
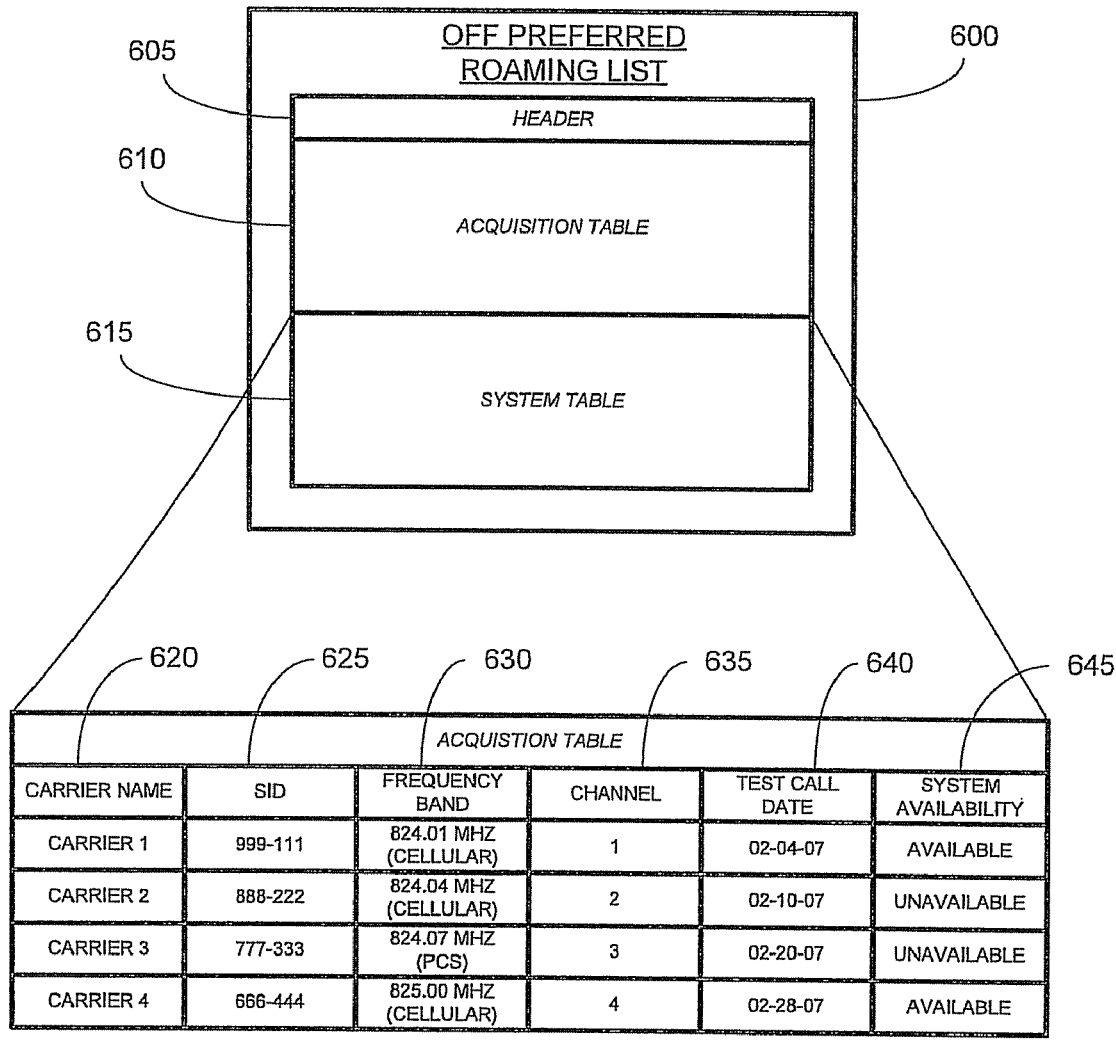
FIG. 6 is a data diagram illustrating an OPA Table structure illustrating the content of the OPA System, in accordance with an exemplary implementation.

FIG. 6 is an abstract data diagram illustrating an OPA Table structure usable in conjunction with certain of the example techniques disclosed herein. It will be appreciated that the exact structure of the OPA Table used within examples of the invention need not follow the example of FIG. 6 nor conform to any particular format. Thus, while the illustrated structure is consistent with TIA/EIA IS-683, any other suitable structure, whether consistent with this recommendation or not, may be used.

The exemplary OPA Table 600 comprises a collection of associated data fields for storing information related to Off PRL roaming carriers. The illustrated data fields include a header 605, an acquisition table 610, and a system table 615. The header 605 contains information usable for administrative purposes, e.g., to locate the table, track the version and/or date of the table, and so on. The acquisition table 610 contains a tabulation of frequencies and service types usable by the telematics device to connect to Off PRL carrier networks. The system table 615 indicates which network systems the telematics unit is to use and/or or ignore, and may also contain data for mapping systems to geographic areas. In total, these elements are usable to specify a selection of one or more alternative networks for roaming.

An entry in the OPA table may consist of the carrier name 620, system identification number (SID) 625 (identity of the wireless network that the VCP 110 is currently accessing) the frequency band 630, channel 635, date of test call 640, and system availability 645. Once a wireless carrier is added to the OPA Table, a test call will not be performed if that system is acquired again until a period of time has lapsed. This time value is a configurable parameter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary implementations of this invention are described herein, including the best mode known to the inventors for carrying out the invention. Variations of those exemplary implementations may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of acquiring an off PRL carrier system for a mobile telecommunications device having a PRL for use when roaming, the method comprising in order:

identifying a PRL for use with a current mobile telecommunications device location and attempting to acquire service at the mobile telecommunications device from one or more carriers listed in the PRL, and determining that such service was not acquired;

attempting to acquire service from each carrier on a predefined acquisition group list including only wireless carriers that are not listed in the PRL, wherein the number of carriers on the predefined acquisition group list is greater than one;

for each carrier of the predefined acquisition group list for which service is acquired, placing a test call and designating the carrier as available in the list if the test call succeeds; and after testing each acquired carrier on the predefined acquisition group list, acquiring for future service a carrier designated in the list as available.

2. The method according to claim 1, wherein designating a carrier as available in the list further comprises maintaining an off PRL identifier data group containing respective carrier identifiers for each carrier of the predefined acquisition group and associating a status identifier with one or more such carrier identifiers to record an indication of the availability of the associated carrier.

3. The method according to claim 1, wherein the test call is an OPA test call to the active carrier.

4. The method according to claim 3, wherein the OPA test call is a data test call comprising an SO33 Data Test Call.

5. The method according to claim 3, wherein the OPA test call is a voice test call comprising an SO3 Voice Test Call.

6. The method according to claim 1, further comprising generating the predefined acquisition group prior to the step of attempting to acquire service from a first one of one or more carriers of the predefined acquisition group.

7. The method according to claim 6, wherein generating the predefined acquisition group comprises scanning by the mobile telecommunications device wireless bands including one or more bands from each of an A and a B side cellular bands.

8. The method according to claim 7, wherein generating the predefined acquisition group comprises scanning a PCS band.

9. An electronic memory of a telematics unit having thereon computer-executable instructions for acquiring an off PRL carrier system from a mobile telecommunications device, the device having a PRL for use when roaming, the computer-executable instructions comprising instructions for, in order:

first identifying a PRL for use in the mobile telecommunications device's current location and attempting to acquire service at the mobile telecommunications device from one or more carriers listed in the PRL, and determining that such service is not acquired;

then attempting to acquire service from all carriers of a predefined acquisition group list which includes only wireless carriers that are not listed in the PRL, wherein the number of carriers on the predefined acquisition group list is greater than one, and for each carrier so acquired placing a test call, and for all such carriers for which the test call succeeds, designating the carrier as available in the predefined acquisition group list; and then after testing each acquired carrier on the predefined acquisition group list, acquiring for future service a carrier designated in the list as available.

10. The electronic memory of a telematics unit according to claim 9, wherein the test call is an OPA test call to the active carrier.

11. The electronic memory of a telematics unit according to claim 10, wherein the OPA test call is a data test call comprising an SO33 Data Test Call.

12. The electronic memory of a telematics unit according to claim 10, wherein the OPA test call is a voice test call comprising an SO3 Voice Test Call.

13. The electronic memory of a telematics unit according to claim 9, the computer-executable instructions comprising further comprising instructions for generating the predefined acquisition group prior to the step of attempting to acquire service from a carrier of the predefined acquisition group.

14. The electronic memory of a telematics unit according to claim 13, wherein generating the predefined acquisition group comprises scanning by the mobile telecommunications device wireless bands including one or more bands from each of an A and a B side cellular bands.

15. The electronic memory of a telematics unit according to claim 14, wherein generating the predefined acquisition group comprises scanning a PCS band.

* * * * *